No. 659,657.  
Patented Oct. 16, 1900.  
F. G. FELTER.  
CARBONATING APPARATUS.  
(Application filed Oct. 26, 1899.)  
(No Model.)  
2 Sheets—Sheet 1.
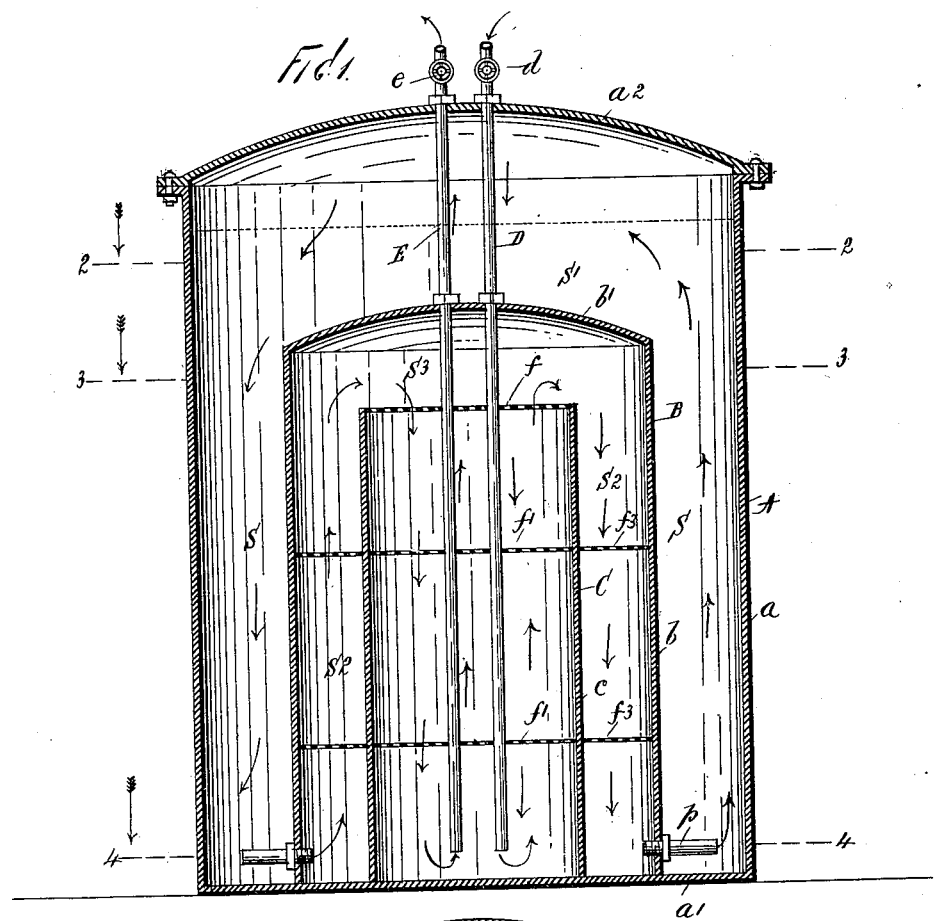
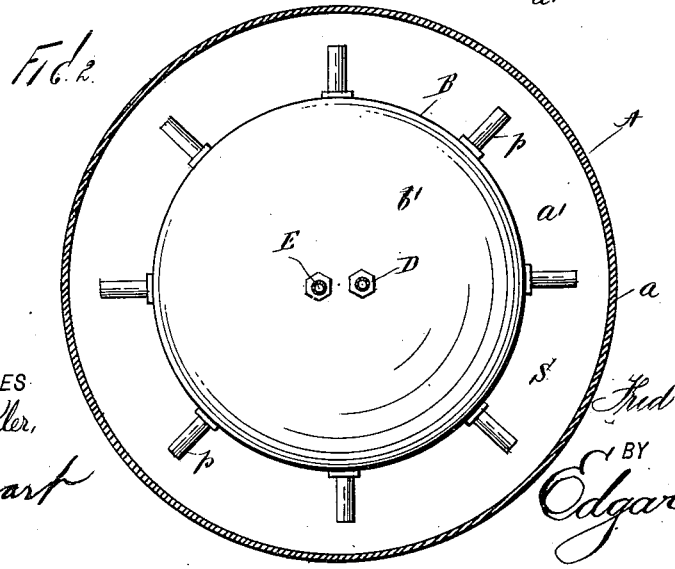
WITNESSES  
INVENTOR  
ATTORNEYS.

No. 659,657. Patented Oct. 16, 1900.
F. G. FELTER.
CARBONATING APPARATUS.
(Application filed Oct. 26, 1899.)
(No Model.) 2 Sheets—Sheet 2.
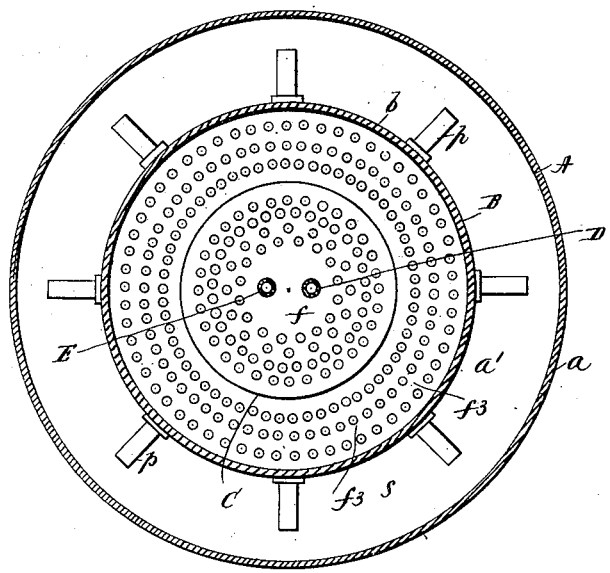
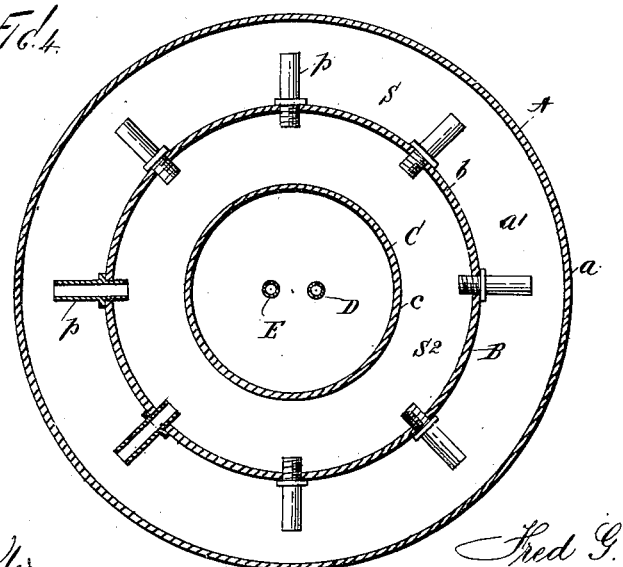
WITNESSES
INVENTOR
Fred G. Felter,
BY
Edgar Tate & Co
ATTORNEYS

UNITED STATES PATENT OFFICE.

FRED GEROW FELTER, OF NEW YORK, N. Y., ASSIGNOR OF TWO-THIRDS TO ARTHUR M. GEROW, OF SAME PLACE, AND ABRAM A. DEMAREST, OF NYACK, NEW YORK.

CARBONATING APPARATUS.

SPECIFICATION forming part of Letters Patent No. 659,657, dated October 16, 1900.

Application filed October 26, 1899. Serial No. 734,794. (No model.)

*To all whom it may concern:*

Be it known that I, FRED GEROW FELTER, a citizen of the United States, residing at New York, in the county of New York and State of New York, have invented certain new and useful Improvements in Carbonating Apparatus, of which the following is a full and complete specification, such as will enable those skilled in the art to which it appertains to make and use the same.

This invention relates to carbonating apparatus; and it has for its object to provide an improved apparatus of this character which will be exceedingly simple in construction, of large capacity, capable of convenient operation, and which will be generally more effective and efficient.

The invention is fully disclosed in the following specification, of which the accompanying drawings form a part, in which the separate parts of my improvement are designated by the same letters of reference in each of the views, and in which—

Figure 1 is a vertical sectional view of an apparatus embodying my invention; Fig. 2, a transverse horizontal sectional view taken on the line 2 2 of Fig. 1. Fig. 3 is a transverse horizontal sectional view taken on the line 3 3 of Fig. 1, and Fig. 4 is a transverse horizontal sectional view taken on the line 4 4 of Fig. 1.

Referring to the drawings, A designates a main cylinder which forms the outer casing of the apparatus. This cylinder is hermetically closed or sealed and is preferably of cylindrical contour in horizontal cross-section, and it comprises sides $a$, a bottom $a'$, and a top $a^2$, said top being preferably concavo-convex or in the form of a dome to provide a large space above the normal level of the water or other fluid to be carbonated, in which space the gas-pressure will be maintained.

B designates an inner cylinder, which is contained within the cylinder or casing A and is of somewhat less transverse diameter and of less height than the outer cylinder, so that a space or passage-way, as at $s$, exists between the exterior walls of the inner cylinder B and the interior walls of the outer cylinder or casing A and entirely surrounds said inner cylinder, and a relatively-greater space or distance, as at $s'$, exists between the top of the inner cylinder B and the top of the outer cylinder A. This inner cylinder is also preferably of cylindrical contour in horizontal cross-section and comprises side walls $b$ and a top $b'$, which latter is also preferably of concavo-convex contour or dome-shaped. The bottom of the inner cylinder B is preferably formed by the bottom $a'$ of the outer casing A; but it may be independently provided, if desired. The inner casing B is securely mounted within the casing A, and the intermediate surrounding space $s$ is preferably free and open and unobstructed by partitions. The said inner casing is in its body structure hermetically closed or sealed; but its interior communicates with the intermediate space $s$ by means of a set of tubes or pipes $p$, projecting laterally and radially through and from the walls $b$ of the cylinder B into the surrounding intermediate space $s$, said tubes or pipes being arranged at a point near the bottom of the cylinder B and just above the bottom $a'$ of the outer casing A, being preferably arranged to project some distance within the space $s$, so that their outer ends are at approximately the central portion of said space.

C designates a middle cylinder, which is contained within the cylinder B and is of somewhat less diameter than the latter, so that a space, as at $s^2$, exists between the exterior walls of said cylinder C and the interior walls of the cylinder B. The cylinder C is also of less height than the cylinder B, so that a space, as at $s^3$, exists between the top of said cylinder C and top or dome of the cylinder B. Said cylinder C is, preferably, of cylindrical contour in horizontal cross-section, corresponding to the other cylinders B and A, and comprises side walls $c$, its bottom being preferably formed by the bottom $a'$ of the outer casing A, though it may be separately provided. This middle cylinder C is not provided with a closed top or dome, as are the cylinders B and A, but it is securely mounted in position within the intermediate cylinder B. The top of the middle cylinder is formed by a foraminous or perforated plate $f$, and within said cylinder C, at different points on a horizontal plane and one above the other, are arranged two or more foraminous or perforated partitions $f'$, which operate to virtually divide said middle cylinder C into different successive compartments.

In the space $s^2$ between the exterior walls of the middle cylinder C and the inner walls of the intermediate cylinder B are arranged, at different points on horizontal planes and one above the other, annular foraminous partitions $f^3$, which are preferably coincident in arrangement and number with the corresponding partitions $f'$ within the cylinder C and which operate to divide the interior space $s^2$ of the cylinder B into successive compartments. It will be understood that the cylinders C, B, and A virtually form reservoirs or containers into and through which the gas and fluids successively pass and which contain said gas and fluids.

D designates a pipe by which the water or other fluid to be carbonated, as well as the carbonating-gas, is adapted to be fed into the apparatus. This pipe preferably extends through the top $a^2$ of the outer casing A, through the top $b'$ of the intermediate cylinder B, and downwardly into the middle cylinder C through the foraminous top $f$ and the partitions $f'$, the lower end of said pipe terminating at a point a short distance above the bottom. A corresponding pipe E is arranged in a similar or corresponding position with relation to the pipe D for the purpose of drawing off the carbonated water or other liquid.

The operation and advantages of my invention will be readily understood by those skilled in the art to which it appertains. In practice the water or other fluid to be carbonated is first fed into the apparatus through the feed-pipe D until it reaches a level above the top of the intermediate cylinder B, said level being preferably at about the point indicated by the dotted line $l$ in Fig. 1. It will be understood that in passing into the apparatus the water will flow into the middle cylinder C and through the foraminous partitions $f'$ and $f$ into the intermediate cylinder B and through the foraminous partitions $f^3$ and the pipes $p$ into the outer cylinder or casing A and that both the middle cylinder C and intermediate cylinder B will be entirely filled with water, while the outer cylinder A will be filled to the level-point $l$. After the water is thus filled into the apparatus the carbonating-gas is fed through the same pipe D and will traverse the same path as that just described with respect to the water. In this reverse passage of the gas upwardly and downwardly and in view of the resistance to a direct passage by the foraminous partitions, arranged as hereinabove described, and the forcing of the gas through said partitions the whole volume or body of the water will be thoroughly carbonated, as will be understood, and the surplus gas will fill the dome-space of the outer casing or cylinder above the level of the water and exert the necessary pressure to suitably effect the drawing off of the carbonated water as desired. The carbonated water is drawn off through the pipe E, in which operation the foraminous partitions of both the middle cylinder C and the intermediate cylinder B will further operate to insure effective carbonating of the whole volume or body of the water.

The inlet-pipe D and the outlet-pipe E are respectively provided with suitable shut-off valves or cocks, as at $d$ and $e$.

It will be noted that the construction and arrangement of my improved carbonating apparatus are such that it is adapted to at all times contain a large supply of carbonated water or other liquid and that it is further adapted for the effective carbonating of a large body of water or liquid in a rapid and thorough manner.

Having fully described my invention, I claim as new and desire to secure by Letters Patent—

1. An improved carbonating apparatus, comprising a plurality of cylinders or casings arranged one within the other, the innermost casing having a foraminous top portion and the next inclosing casing having a closed top portion and the compartments or interior spaces of the respective casings being intersected by foraminous partitions extending across said interior spaces, in combination with an inlet-pipe extending vertically into and through the casing having the closed top portion and into the innermost casing and terminating at a point within the bottom portion of the innermost casing, an outlet-pipe extending vertically in a manner corresponding to the inlet-pipe and terminating within the lower portion of the innermost casing, and means of communication between two of said casings at their lower portions, whereby the course of the liquid in both the inlet and outlet passes through the plurality of casings and through said foraminous diaphragms and in and out at the lower portion of the inner casing.

2. An improved carbonating apparatus, comprising the closed outer casing, and a plurality of inner casings arranged within said outer casing and one within the other, the innermost one of said inner casings having a foraminous top portion and the casing inclosing said inner casing having a closed top portion and the interior compartments or spaces of said plurality of inclosed inner casings being intersected by foraminous diaphragms extending across said interior spaces, in combination with an inlet-pipe extending vertically through the outer casing and through the top portions of said inner casings to and within the bottom portion of the innermost casing, an outlet-pipe arranged in corresponding manner with respect to the inlet-pipe and extending to and within the lower portion of the innermost casing, and means of communication arranged at the lower portion of the outermost of the inner plurality of casings and communicating with the space or compartment of the outer casing at the bottom portion thereof, substantially as and for the purpose set forth.

In testimony that I claim the foregoing as my invention I have signed my name, in presence of the subscribing witnesses, this 25th day of October, 1899.

FRED GEROW FELTER.

Witnesses:
F. A. STEWART,
V. M. VOSLER.